Figure 1:
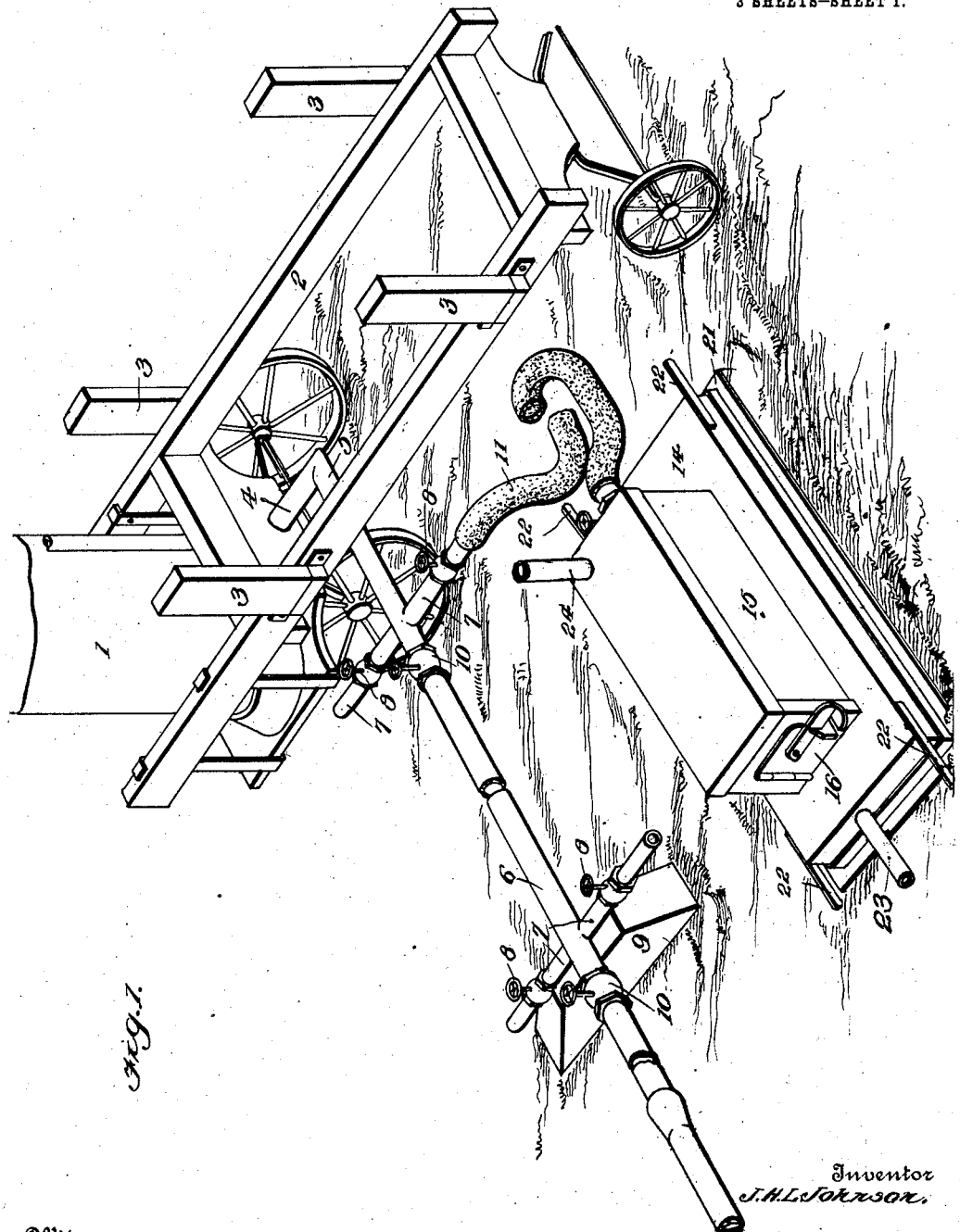

J. H. L. JOHNSON.
TOBACCO BED STEAMING APPARATUS.
APPLICATION FILED MAY 8, 1911.

1,021,529.

Patented Mar. 26, 1912.
3 SHEETS—SHEET 2.

Witnesses
W. T. Woodson.
Juana M. Fallin

Inventor
J. H. L. Johnson.

By
H. A. Stacy, Attorneys.

J. H. L. JOHNSON.
TOBACCO BED STEAMING APPARATUS.
APPLICATION FILED MAY 8, 1911.

1,021,529.

Patented Mar. 26, 1912.
3 SHEETS—SHEET 3.

Witnesses

Inventor
J. H. L. Johnson.

By ____, Attorneys.

UNITED STATES PATENT OFFICE.

JOHN H. L. JOHNSON, OF SPRINGFIELD, TENNESSEE, ASSIGNOR TO SPRINGFIELD PLANT-BED STEAMING COMPANY, OF SPRINGFIELD, TENNESSEE.

TOBACCO-BED-STEAMING APPARATUS.

1,021,529.               Specification of Letters Patent.     Patented Mar. 26, 1912.

Application filed May 8, 1911. Serial No. 625,849.

*To all whom it may concern:*

Be it known that I, JOHN H. L. JOHNSON, citizen of the United States, residing at Springfield, in the county of Robertson and State of Tennessee, have invented certain new and useful Improvements in Tobacco-Bed-Steaming Apparatus, of which the following is a specification.

This invention comprehends certain new and useful improvements in apparatus for preparing the soil for planting or seeding and relates particularly to an improved mechanism for steaming tobacco beds, whereby the seeds, seed germs and roots of noxious weeds or other vegetation, the after growth of which would be detrimental to the crop which it is designed to cultivate, are destroyed.

The present invention has for its primary object an apparatus of this character which will have a maximum efficiency over a relatively large area of ground, whereby the boiler for the supply of the steam may remain in the road and the steaming hood easily moved from one bed to another over a comparatively large number of beds, this being a desideratum, as is evident, owing to the fact that it is sometimes impracticable, if not impossible, to move the traction or other boiler furnace from the road, on account of the fencing or underbrush, whereas with my invention the piping that conveys the steam, may easily pass through the fence or underbrush, so as to make connection with the steam hood at the beds.

The invention also has for its object an improved apparatus of this character embodying a novel and useful construction of steaming hood, whereby either moist or superheated dry steam may be applied to the ground, according to the particular atmospheric and other conditions thereof existing at the time it becomes necessary to prepare the beds for planting or seeding. And the invention also aims to generally improve this class of devices, and to render them more useful and commercially desirable.

With these and other objects in view as will more fully appear as the description proceeds, the invention consists in certain constructions, arrangements and combinations of the parts that I shall hereinafter fully describe and claim.

Figure 2:
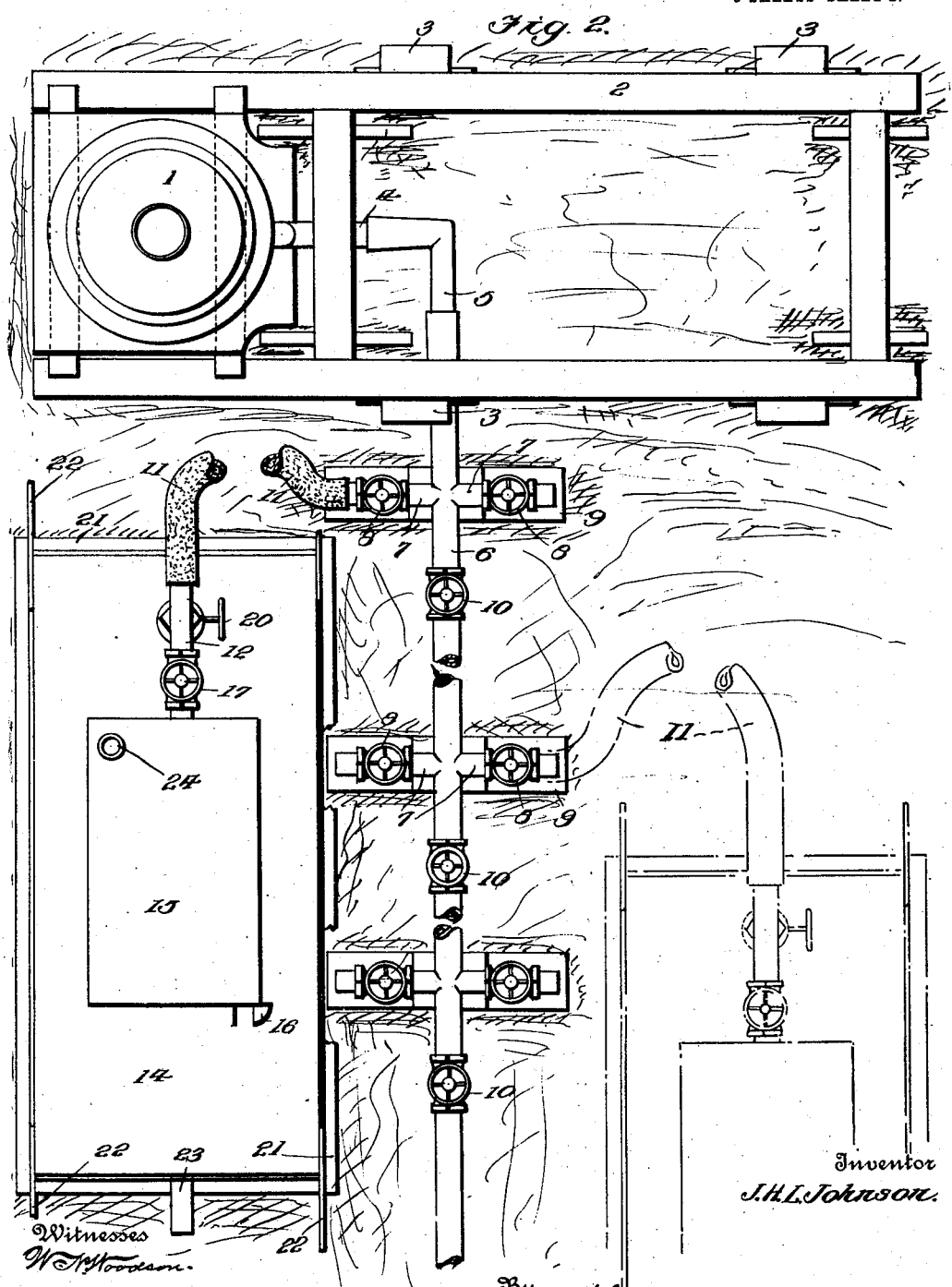
Figure 3:
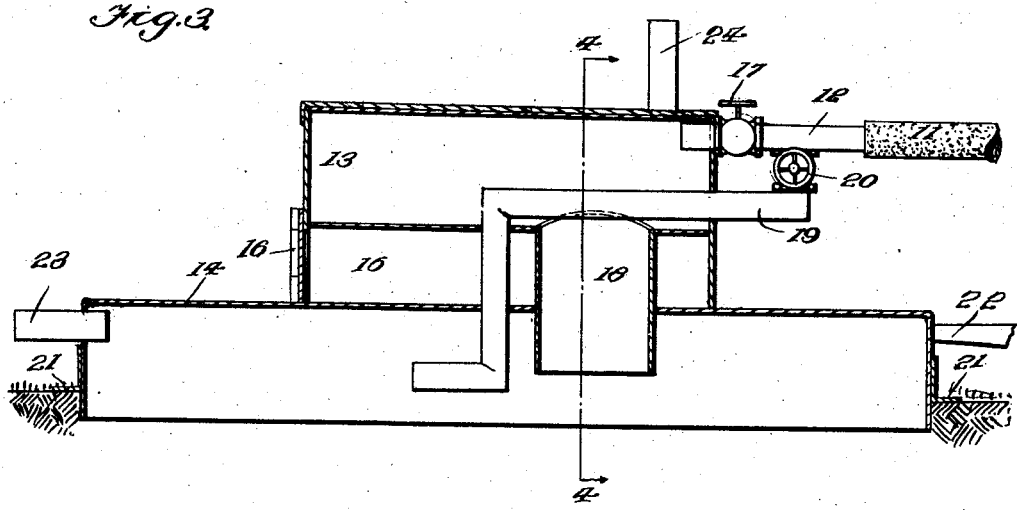
Figure 4:
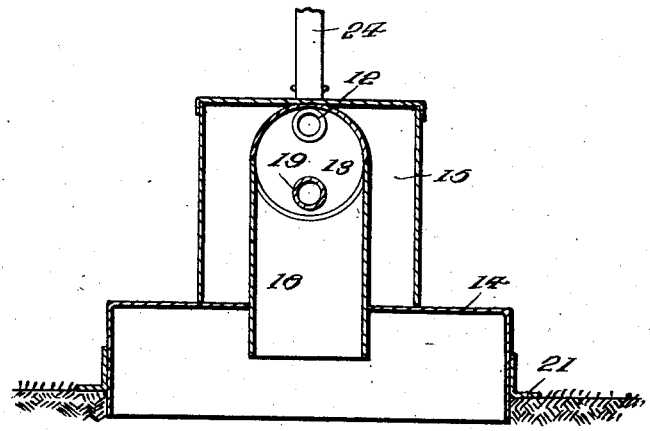

For a full understanding of the invention, reference is to be had to the following description and accompanying drawings, in which:

Figure 1 is a perspective view of one form or embodiment of my invention, only a portion of the piping being shown; Fig. 2 is a top plan view of the apparatus; Fig. 3 is a longitudinal sectional view through the steaming hood; and, Fig. 4 is a transverse sectional view of the hood, the section being taken approximately on the line 4—4 of Fig. 3.

Corresponding and like parts are referred to in the following description and indicated in all the views of the drawings by the same reference characters.

In carrying out my invention, I employ a traction or other portable steam boiler 1, mounted upon one end of a vehicle 2 of any desired construction and type, said vehicle being preferably provided with removable standards 3, as shown. The steam supply pipe includes a section 4 leading directly from the boiler 1, and an elbow 5 connected to one end of the section 4 and mounted to turn thereon about a substantially longitudinally extending and horizontally disposed axis, and piping 6 of any desired length and constructed in any desired number of joined parts or sections. The piping 6 is detachably connected at one end to the laterally extending end of the elbow 5, as indicated in Fig. 2, and is provided with any desired number of forwardly and rearwardly extending branches 7 arranged in pairs, as shown, and each provided with a globe or other valve 8. These branches 7 may be disposed at any desired distances apart. The piping 6 may be supported in any desired way in slightly elevated position from the ground, as by blocks 9 on which the pipe loosely rests. The piping 6 is provided between every two pairs of branches 7 with globe or other valves 10. A preferably flexible hose 11 is used to be connected to any of the branches 7, or, if desired, to the end of the piping 6, with a nozzle 12 leading into the superheating chamber 13 of the steaming hood 14, the latter being constructed of any desired material or substance, and of any desired shape and size according to the particular requirements of the case and being open at the bottom, as clearly indicated in Figs. 3 and 4.

The superheating chamber 13 is surrounded by a furnace 15 which is provided at either end with a door 16, whereby the chamber may be heated to supply the hood 14 with dry steam, whenever desired, this being necessary under some conditions of the soil, particularly in view of the fact that the steam will be liable to condense in traveling through the relatively long piping 6 and hose 11, before it reaches the hood. The nozzle 12 is controlled by means of a globe or other valve 17 and the dry steam is fed from the chamber 13 to the interior of the hood 14 by means of a conduit 18 which leads downwardly from the superheating chamber through the top of and into the hood, as clearly illustrated in Figs. 3 and 4.

The nozzle 12 is provided with a branch pipe 19 controlled by a valve 20, said pipe 19 extending into one end of the chamber 13 and thence extending downwardly through and opening into the hood 14, whereby relatively moist steam may be fed to the hood 14 by closing the valve 17, omitting the fire in the furnace 15 and opening the valve 20 so as to permit the steam to pass directly from the nozzle 12 through the pipe 19 into the hood. Preferably, the hood is provided with a marginal outstanding flange 21 extending entirely therearound above the lower edge of the hood, whereby said lower edge may be sunk into the ground and the flange 21 caused to engage with the ground so as to make a practically steam tight joint around the hood. 22 designates handles projecting out from the opposite ends of the hood, whereby the hood may be easily carried from place to place. 23 designates the steam discharge pipe of the hood and 24 designates the stack of the furnace.

From the foregoing description in connection with the accompanying drawings, the operation of my improved tobacco bed steaming apparatus will be apparent. In traveling to the place of operations, the hood 14 is carried on the vehicle 2, being held on the body of the vehicle between the standards 3, the detachable piping being also laid on the vehicle, as well as the supporting blocks 9 and the detachable flexible hose connection 11. Upon arriving at the place where it is desired to steam the beds, the apparatus is unshipped, the vehicle 2 left standing in the road alongside of the beds, if necessary, and the elbow 5 is fitted to the section 4 and the piping 6 fitted to the elbow 5 and extended laterally through the fence, for example, over the set of beds which it is desired to steam. Obviously, owing to the fact that the elbow 5 is mounted for a turning movement about a longitudinally extending and horizontally disposed axis on the section 4 leading from the steam boiler 1, the piping 6 may be inclined as required and extended up a hill, which is another advantage incidental to my improved construction and arrangement of parts. In starting the steaming process, the hose 11 may be connected to the rearmost branch 7 nearest to the vehicle 2 and the adjoining beds steamed the required time one after the other, after which the hose connection may be removed from said branch 7 and taken to the next rearwardly extending branch, and then to the next, and finally to the outer end of the piping 6 and then connected to the forwardly extending branches one after the other, until a comparatively wide range of beds has been steamed, it being, of course, understood that not only do the plurality of branches 7 and the extent of piping 6 permit the disposition of the steaming hood 14 over a wide area, but the same result is to a measure accomplished by the length of flexible hose connection 11, whereby a plurality of beds may be steamed with the hose 11 connected to only one of the branches 7. It is, of course, to be understood that when the hose 11 is connected to either branch of a pair, the adjoining globe valve 10 between such pair and the outer end of the piping 6 is closed. From this description, the operation of the device will be clear to those skilled in the art to which this invention appertains. Should dry steam be required, the globe valve 20 is closed and the valve 11 is open, whereupon the steam will be again heated in the chamber 13 and discharged therefrom into the hood 14 through conduit 18. On the other hand, if comparatively moist steam be necessary, the valve 17 is closed and the valve 20 opened, whereupon the steam will pass directly from the nozzle 12 through the pipe 19 into the hood.

While the accompanying drawings and foregoing description disclose what I believe to be the preferred embodiment of my invention, it is to be understood that the invention is not limited thereto, but that various changes may be made in the construction, arrangement and proportions of the parts without departing from the scope of the invention as defined in the appended claims.

Having thus described the invention, what is claimed as new is:

1. An apparatus of the character described, embodying a steam boiler provided with a pipe section, an elbow mounted to turn on said section and extending laterally therefrom, piping detachably connected to the laterally extending end of the elbow, the piping being provided with forwardly and rearwardly extending branches arranged in pairs, each branch being provided with a valve and the piping being provided intermediate of the pairs with valves, and a steaming hood arranged for operative connection with any of said branches.

2. In an apparatus of the character described, a steaming hood, a superheating chamber mounted on said hood, and communicating therewith, a steam supply nozzle leading into the chamber and opening therein, the nozzle being provided with a branch pipe opening into the hood, means for controlling the nozzle and its branch pipe, and a furnace for heating said superheating chamber.

3. In an apparatus of the character described, a steaming hood, a superheating chamber supported thereon, and provided with a conduit extending downwardly therefrom and opening into the hood, a pipe provided with a nozzle opening into the chamber and provided with a branch extending into and opening into the hood, independent controls for the nozzle and its branch, and a furnace for heating said chamber.

4. In an apparatus of the character described, an open bottom steaming hood provided above its lower edge with an outstanding marginal flange for the purpose specified.

In testimony whereof, I affix my signature in presence of two witnesses.

JOHN H. L. JOHNSON. [L. S.]

Witnesses:
  T. M. WOODARD,
  THOMAS LOWE.